United States Patent
Nguyen et al.

(10) Patent No.: US 10,986,525 B2
(45) Date of Patent: Apr. 20, 2021

(54) RELAYING VEHICULAR COMMUNICATIONS USING NETWORK CODING

(71) Applicant: QUALCOMM Incorporated, San Diego, CA (US)

(72) Inventors: Tien Viet Nguyen, Bridgewater, NJ (US); Shailesh Patil, San Diego, CA (US); Sudhir Kumar Baghel, Hillsborough, NJ (US); Junyi Li, Chester, NJ (US); Kapil Gulati, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/506,487

(22) Filed: Jul. 9, 2019

(65) Prior Publication Data
US 2020/0022013 A1 Jan. 16, 2020

Related U.S. Application Data

(60) Provisional application No. 62/697,118, filed on Jul. 12, 2018.

(51) Int. Cl.
*H04L 12/26* (2006.01)
*H04W 28/02* (2009.01)
(Continued)

(52) U.S. Cl.
CPC ......... *H04W 28/021* (2013.01); *H04L 1/0076* (2013.01); *H04L 67/1093* (2013.01);
(Continued)

(58) Field of Classification Search
None
See application file for complete search history.

(56) References Cited

U.S. PATENT DOCUMENTS

| 2010/0105409 A1* | 4/2010 | Agarwal ............... H04W 64/00 |
| | | 455/456.1 |
| 2011/0238794 A1* | 9/2011 | Wu ....................... H04L 67/104 |
| | | 709/220 |

(Continued)

FOREIGN PATENT DOCUMENTS

| CN | 104080145 B | 5/2018 |
| EP | 3531647 A1 | 8/2019 |

(Continued)

OTHER PUBLICATIONS

Federico L., et al., "Evaluating multi-hop beaconing forwarding strategies for IEEE 802.11p vehicular networks", 2013 IEEE Vehicular Networking Conference, IEEE, Dec. 16, 2013, pp. 31-38, XP032567200, DOI: 10.1109/VNC.2013.6737587, [retrieved on Feb. 11, 2014], p. 31, line 28, last paragraph—p. 32, left-hand column, line 15 p. 34, right-hand column, line 30—p. 35, right-hand column, line 17.

(Continued)

*Primary Examiner* — Phirin Sam
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment may identify two or more peer-to-peer (P2P) communications to be combined based at least in part on a respective location of each of two or more originating UEs from which the two or more P2P communications are received; combine the two or more P2P communications, using network coding, to form a combined P2P communication; and transmit the combined P2P communication. Numerous other aspects are provided.

30 Claims, 9 Drawing Sheets

(51) Int. Cl.
*H04L 1/00* (2006.01)
*H04W 4/46* (2018.01)
*H04W 4/021* (2018.01)
*H04L 29/08* (2006.01)
*H04W 84/00* (2009.01)
*H04W 88/04* (2009.01)

(52) U.S. Cl.
CPC .............. *H04W 4/021* (2013.01); *H04W 4/46* (2018.02); *H04W 84/005* (2013.01); *H04W 88/04* (2013.01)

(56) References Cited

U.S. PATENT DOCUMENTS

| | | | | |
|---|---|---|---|---|
| 2012/0278389 | A1* | 11/2012 | Thangadorai | H04W 84/20 709/204 |
| 2013/0036051 | A1* | 2/2013 | Giordano | G06Q 20/325 705/44 |
| 2013/0143599 | A1* | 6/2013 | Li | G01S 5/0018 455/456.2 |
| 2013/0243189 | A1* | 9/2013 | Ekberg | H04L 9/3297 380/44 |
| 2014/0215263 | A1* | 7/2014 | Grube | G06F 11/1088 714/6.24 |
| 2015/0181548 | A1* | 6/2015 | Varoglu | H04W 64/00 455/456.2 |
| 2016/0013857 | A9 | 1/2016 | Lee et al. | |
| 2016/0180316 | A1* | 6/2016 | Wang | G06Q 20/32 705/39 |
| 2016/0270134 | A1* | 9/2016 | Stojanovski | H04W 76/14 |
| 2020/0288471 | A1* | 9/2020 | Yoon | H04W 72/0446 |

FOREIGN PATENT DOCUMENTS

| | | |
|---|---|---|
| WO | 2018064179 A1 | 4/2018 |
| WO | 2018119667 A1 | 7/2018 |

OTHER PUBLICATIONS

International Search Report and Written Opinion—PCT/US2019/041186—ISA/EPO—dated Oct. 15, 2019.
Katti S., et al., "XORs in The Air: Practical Wireless Network Coding", Proceedings of ACM SIGCOMM, Sep. 11, 2006, pp. 1-12, XP002493001, Retrieved from the Internet: URL:http://piper.csail.mit.edu/papers/copesc.pdf, sections 3, 5, 6; figure 5.
Kumar S P., et al., "Congestion control in vehicular networks using network coding", 2014 IEEE International Conference on Communications (ICC), IEEE, Jun. 10, 2014, pp. 2736-2741, XP032632284, DOI: 10.1109/ICC.2014.6883738 [retrieved on Aug. 26, 2014], p. 2737, right-hand column, line 4-p. 2739, left-hand column, line 38.
Zseby T et al., "Evaluation of Building Blocks for Passive One-Way-Delay Measurements", PAM. Passive And Active Measurement Workshop, Apr. 2001, pp. 1-11 , XP000863848, p. 7, right-hand column, line 30-p. 8, right-hand column, line 32, p. 9, right-hand column, line 1-p. 10, left-hand column, line 33.

* cited by examiner

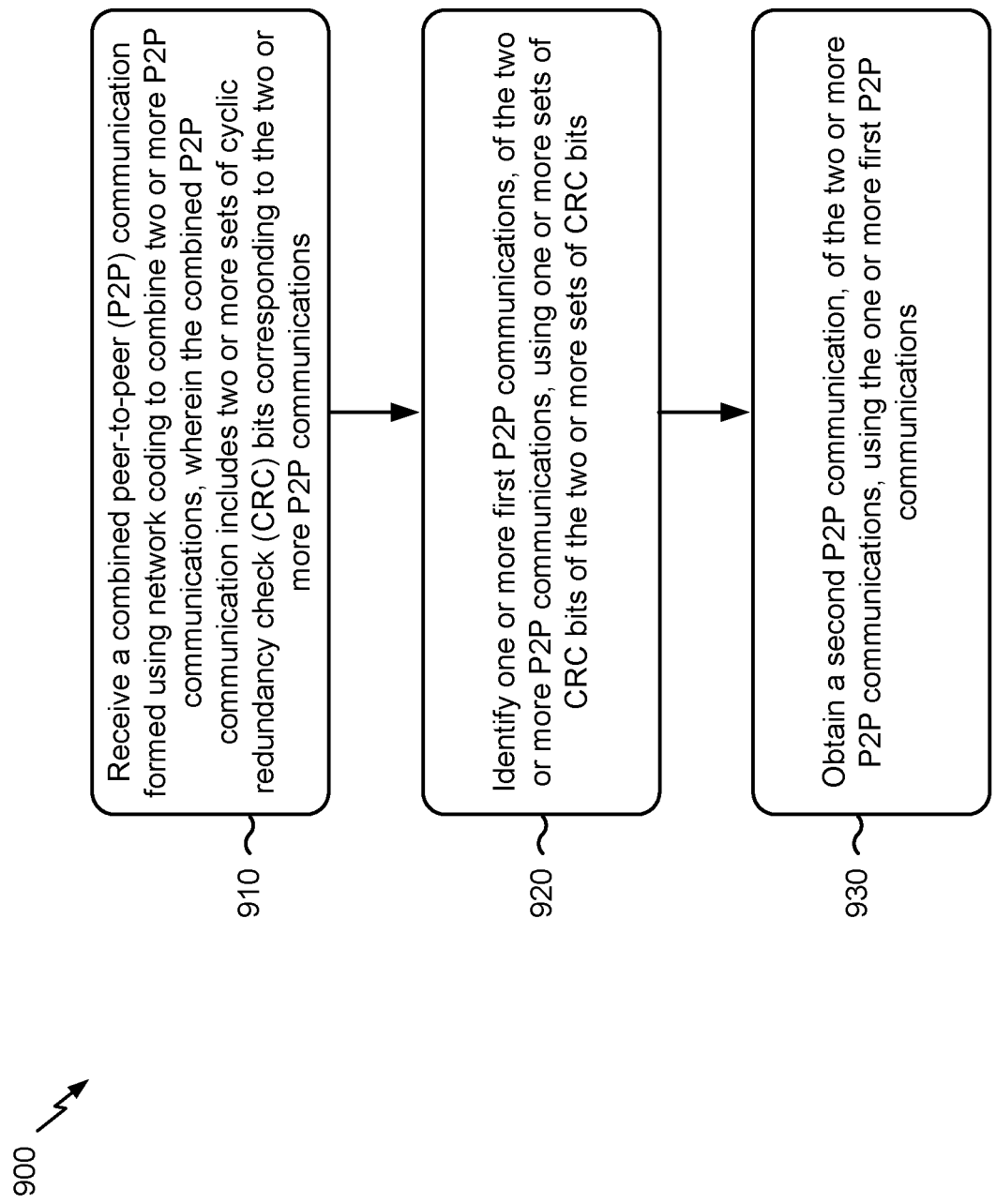

RELAYING VEHICULAR COMMUNICATIONS USING NETWORK CODING

CROSS-REFERENCE TO RELATED APPLICATIONS UNDER 35 U.S.C. § 119

This application claims priority to U.S. Provisional Patent Application No. 62/697,118, filed on Jul. 12, 2018, entitled "TECHNIQUES AND APPARATUSES FOR RELAYING VEHICULAR COMMUNICATIONS USING NETWORK CODING," which is hereby expressly incorporated by reference herein.

FIELD OF THE DISCLOSURE

Aspects of the present disclosure generally relate to wireless communication and to techniques and apparatuses for relaying vehicular communications using network coding.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include identifying two or more peer-to-peer (P2P) communications to be combined based at least in part on a respective location of each of two or more originating UEs from which the two or more P2P communications are received; combining the two or more P2P communications, using network coding, to form a combined P2P communication; and transmitting the combined P2P communication.

In some aspects, a UE for wireless communication may include memory and one or more processors operatively coupled to the memory. The memory and the one or more processors may be configured to identify two or more P2P communications to be combined based at least in part on a respective location of each of two or more originating UEs from which the two or more P2P communications are received; combine the two or more P2P communications, using network coding, to form a combined P2P communication; and transmit the combined P2P communication.

In some aspects, a non-transitory computer-readable medium may store one or more instructions for wireless communication. The one or more instructions, when executed by one or more processors of a UE, may cause the one or more processors to identify two or more P2P communications to be combined based at least in part on a respective location of each of two or more originating UEs from which the two or more P2P communications are received; combine the two or more P2P communications, using network coding, to form a combined P2P communication; and transmit the combined P2P communication.

In some aspects, an apparatus for wireless communication may include means for identifying two or more P2P communications to be combined based at least in part on a respective location of each of two or more originating UEs from which the two or more P2P communications are received; means for combining the two or more P2P communications, using network coding, to form a combined P2P communication; and means for transmitting the combined P2P communication.

In some aspects, a method of wireless communication, performed by a UE, may include receiving a combined P2P communication formed using network coding to combine two or more P2P communications, wherein the combined P2P communication includes two or more sets of cyclic redundancy check (CRC) bits corresponding to the two or more P2P communications; identifying one or more first P2P communications, of the two or more P2P communications, using one or more sets of CRC bits of the two or more sets of CRC bits; and obtaining a second P2P communication, of the two or more P2P communications, using the one or more first P2P communications.

In some aspects, a UE for wireless communication may include memory and one or more processors operatively coupled to the memory. The memory and the one or more processors may be configured to receive a combined P2P communication formed using network coding to combine two or more P2P communications, wherein the combined P2P communication includes two or more sets of CRC bits corresponding to the two or more P2P communications; identify one or more first P2P communications, of the two or more P2P communications, using one or more sets of CRC bits of the two or more sets of CRC bits; and obtain a second P2P communication, of the two or more P2P communications, using the one or more first P2P communications.

In some aspects, a non-transitory computer-readable medium may store one or more instructions for wireless communication. The one or more instructions, when executed by one or more processors of a UE, may cause the one or more processors to receive a combined P2P communication formed using network coding to combine two or more P2P communications, wherein the combined P2P communication includes two or more sets of CRC bits corresponding to the two or more P2P communications; identify one or more first P2P communications, of the two or more P2P communications, using one or more sets of CRC bits of the two or more sets of CRC bits; and obtain a second P2P communication, of the two or more P2P communications, using the one or more first P2P communications.

In some aspects, an apparatus for wireless communication may include means for receiving a combined P2P communication formed using network coding to combine two or more P2P communications, wherein the combined P2P communication includes two or more sets of CRC bits corresponding to the two or more P2P communications; means for identifying one or more first P2P communications, of the two or more P2P communications, using one or more sets of CRC bits of the two or more sets of CRC bits; and means for obtaining a second P2P communication, of the two or more P2P communications, using the one or more first P2P communications.

Aspects generally include a method, apparatus, system, computer program product, non-transitory computer-readable medium, user equipment, originating user equipment, relaying user equipment, receiving user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 8 and 9 are diagrams illustrating example processes performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
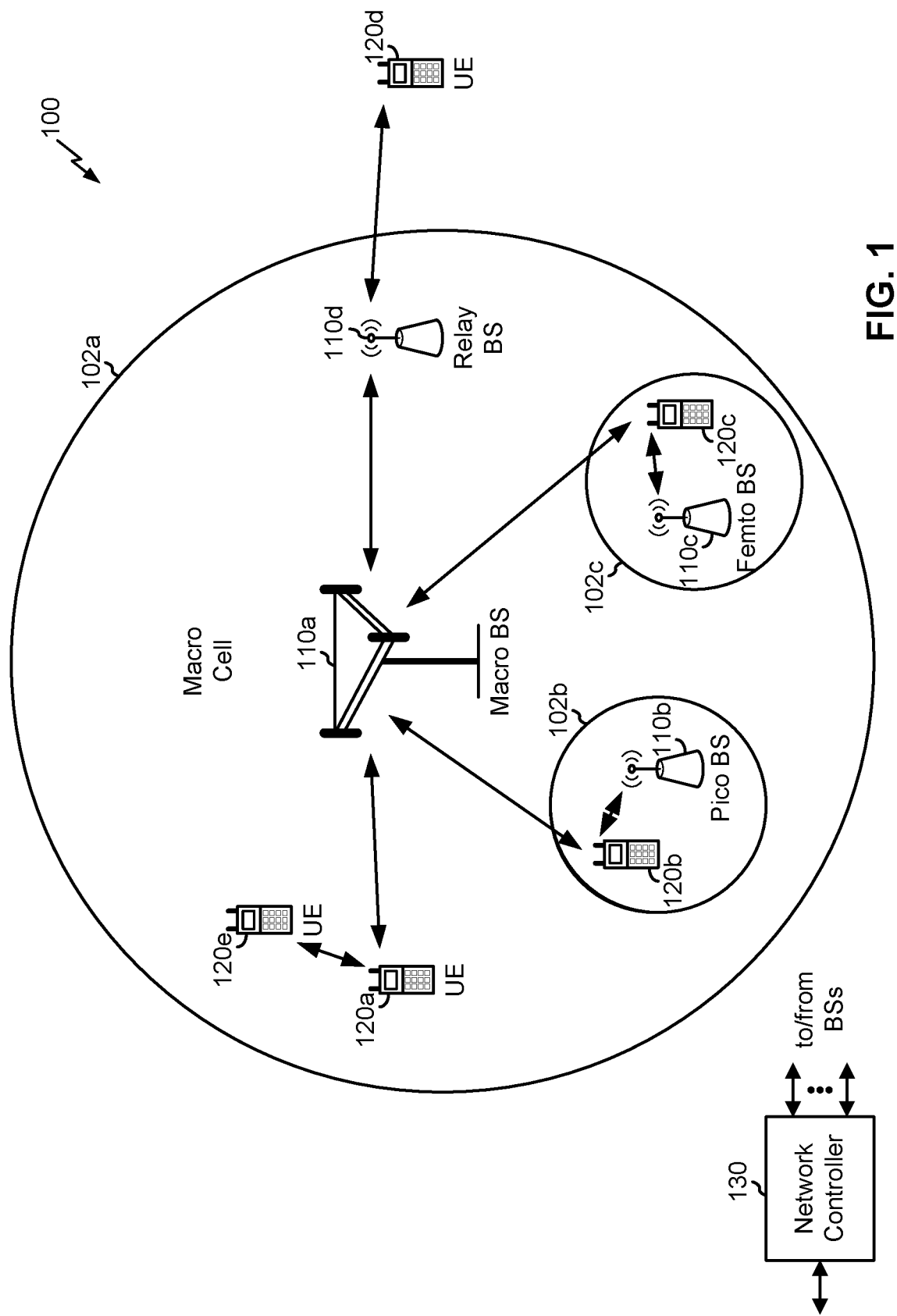
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). Such direct communications via a sidelink channel may be referred to as peer-to-peer (P2P) communications, which may include device-to-device (D2D) communications, vehicle-to-everything (V2X) communications that use a V2X protocol (e.g., which may include a vehicle-to-vehicle (V2V) protocol, a vehicle-to-infrastructure (V2I) protocol, a vehicle-to-pedestrian (V2P) protocol, and/or the like), communications via a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
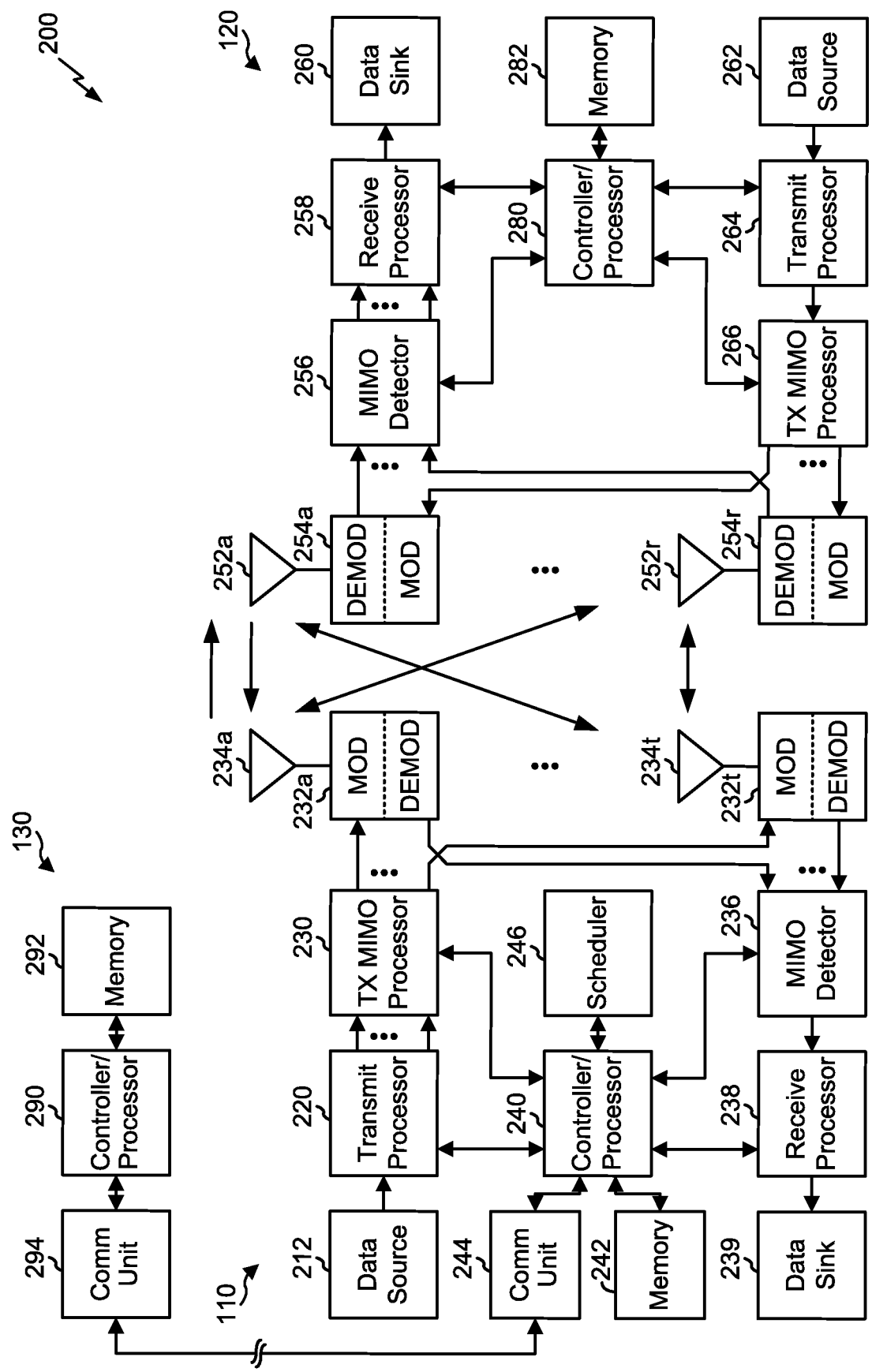
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with relaying for vehicular communications using network coding, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for identifying two or more peer-to-peer (P2P) communications to be combined based at least in part on a respective location of each of two or more originating UEs from which the two or more P2P communications are received (e.g., using controller/processor 280 and/or the like); means for combining the two or more P2P communications, using network coding, to form a combined P2P communication (e.g., using controller/processor 280 and/or the like); means for transmitting the combined P2P communication (e.g., using controller/processor 280, transmit processor 264, TX MIMO processor 266, MOD 254, antenna 252, and/or the like); and/or the like. Additionally, or alternatively, UE 120 may include means for receiving a combined P2P communication formed using network coding to combine two or more P2P communications, wherein the combined P2P communication includes two or more sets of cyclic redundancy check (CRC) bits corresponding to the two or more P2P communications (e.g., using antenna 252, DEMOD 254, MIMO detector 256, receive processor 258, controller/processor 280, and/or the like); means for identifying one or more first P2P communications, of the two or more P2P communications, using one or more sets of CRC bits of the two or more sets of CRC bits (e.g., using controller/processor 280 and/or the like); means for obtaining a second P2P communication, of the two or more P2P communications, using the one or more first P2P communications (e.g., using controller/processor 280 and/or the like); and/or the like. In some aspects, such means may include one or more components of UE 120 described in connection with FIG. 2.

As indicated above, FIG. 2 is provided merely as an example. Other examples may differ from what is described with regard to FIG. 2.

Figure 3:
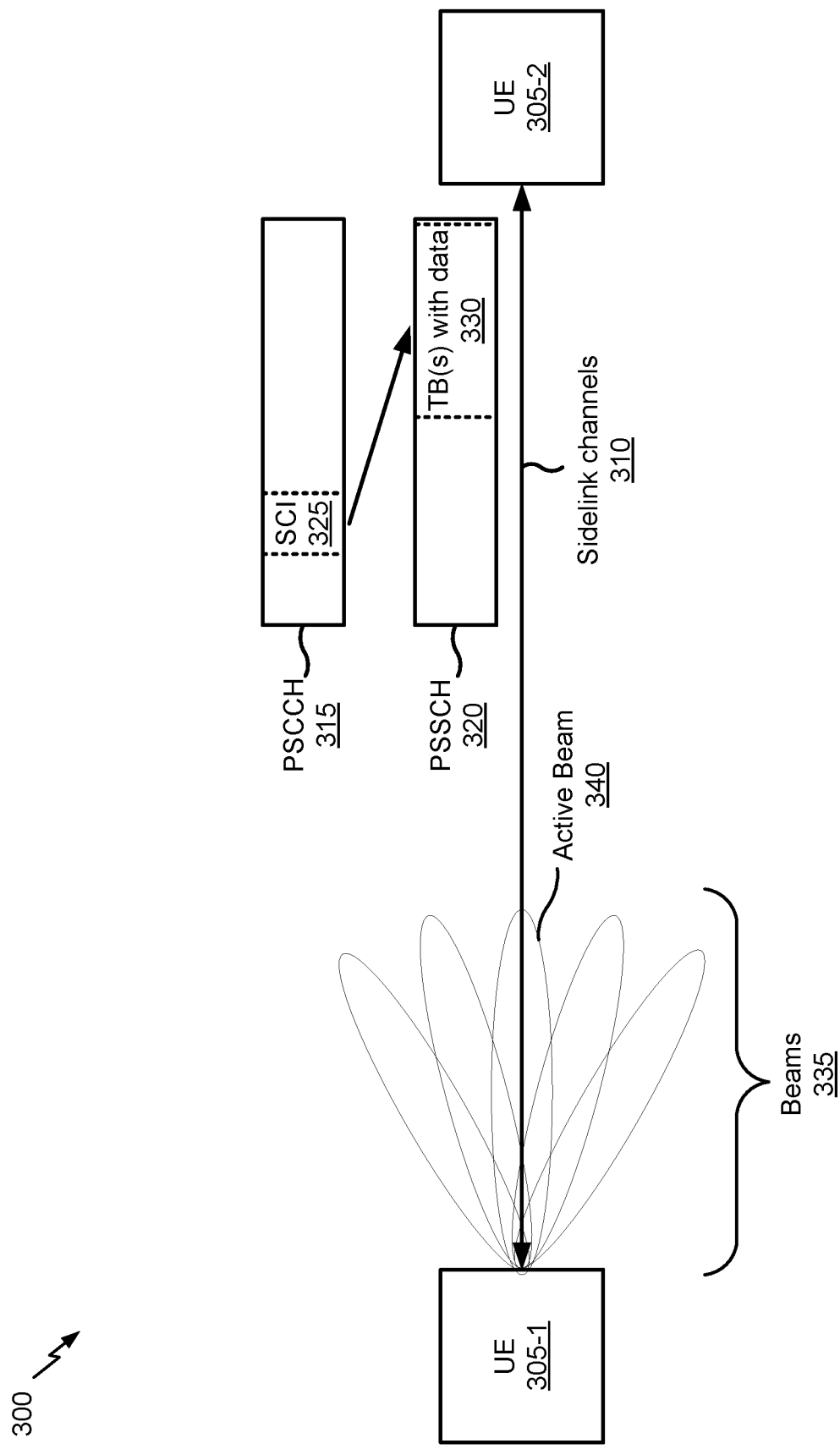
FIG. 3 is a block diagram conceptually illustrating an example of peer-to-peer (P2P) communications via a sidelink, in accordance with various aspects of the present disclosure.

FIG. 3 is a block diagram conceptually illustrating an example of peer-to-peer (P2P) communications via a sidelink, in accordance with various aspects of the present disclosure.

As shown in FIG. 3, a first UE 305-1 may communicate with a second UE 305-2 (and one or more other UEs 305) using P2P communications via one or more sidelink channels 310. In some aspects, the UEs 305 may correspond to one or more other UEs described elsewhere herein, such as UE 120 and/or the like. In some aspects, the sidelink channel 310 may use a PC5 interface and/or may operate in a high frequency band (e.g., the 5.9 GHz band). Additionally, or alternatively, the UEs 305 may synchronize timing of transmission time intervals (e.g., frames, subframes, slots, and/or the like) using global navigation satellite system (GNSS) timing. The UEs 305 may transmit P2P communications, such as V2X communications and/or the like, using the sidelink channel 310.

In some aspects, V2X communications may be one-to-many broadcast and/or multicast communications. In some aspects, V2X communications may not require any physical layer feedback from receiving devices, such as acknowledgement (ACK) or negative acknowledgement (NACK) feedback. In some aspects, V2X communications may be configured without retransmission. In some aspects, V2X communications may be configured with a small number of retransmissions (e.g., one retransmission) that always occur (e.g., without ACK/NACK feedback).

As further shown in FIG. 3, the sidelink channel 310 may include a physical sidelink control channel (PSCCH) 315 and a physical sidelink shared channel (PSSCH) 320. The PSCCH 315 may be used to communicate control information, similar to a physical downlink control channel (PDCCH) and/or a physical uplink control channel (PUCCH) used for communications with a base station 110. The PSSCH 320 may be used to communicate data, similar to a physical downlink shared channel (PDSCH) and/or a physical uplink shared channel (PUSCH) used for communications with a base station 110. For example, the PSCCH 315 may carry sidelink control information (SCI) 325, which may indicate various control information used for sidelink communications, such as one or more resources (e.g., time, frequency, and/or beam resources) where a transport block (TB) 330 that includes data is carried on the PSSCH 320 and/or other control information that may be used to assist in receiving, decoding, and/or demodulating data carried via the PSSCH 320. The TB 330 may include a V2X data communication, such as a basic safety message (BSM), a traffic information message (TIM), a signal phase and time (SPAT) message, a MAP message to convey geographic road information, a cooperative awareness message (CAM), a distributed environment notification message (DENM), an in-vehicle information (IVI) message, and/or the like. In some aspects, the V2X data communication may include data relevant to operation of a vehicle associated with a UE 305.

In some aspects, a UE 305 may operate using transmission mode 4, where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of V2X communications based at least in part on the measurement(s).

Additionally, or alternatively, the UE 305 may perform resource selection and/or scheduling using SCI 325 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

As further shown in FIG. 3, a UE 305 may communicate with other UEs 305 using one or more beams 335, such as an active beam 340. For example, the UEs 305 may include multiple antenna elements to support beamforming using millimeter wave beams 335 in the millimeter wave frequency band. A millimeter wave beam 335 may be capable of higher throughput than a sub-6 GHz transmission, which may be useful for V2X communications (e.g., to transmit camera feeds and/or the like). In some aspects, the UE 305 may support and/or dynamically configure different beam widths for a beam 335, which may change the range of the beam 335. For example, using a wider beam may result in a shorter range than a narrower beam, while using a narrower beam may result in a longer range than a wider beam.

As indicated above, FIG. 3 is provided merely as an example. Other examples may differ from what is described with regard to FIG. 3.

Figure 4:
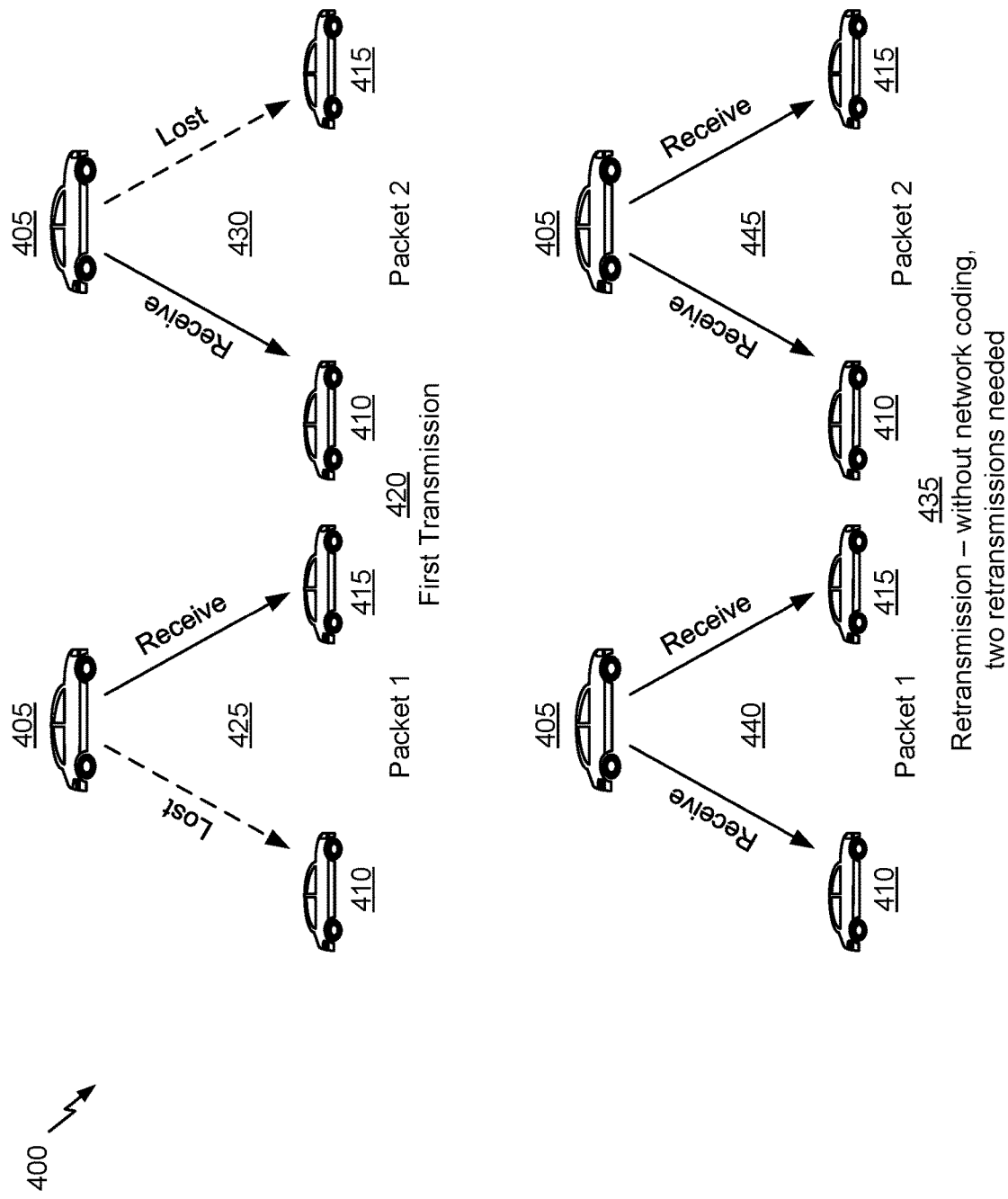
FIG. 4 is a diagram illustrating an example of relaying vehicular communications without using network coding.

FIG. 4 is a diagram illustrating an example 400 of relaying vehicular communications without using network coding.

As shown in FIG. 4, a relaying UE 405 may relay (e.g., transmit) P2P communications received from other UEs, such as originating UEs, and may be associated with a relaying vehicle. For example, the relaying UE 405 may relay one or more P2P communications to a first receiving UE 410, associated with a first receiving vehicle, and a second receiving UE 415 associated with a second receiving vehicle. The UEs 405, 410, and/or 415 may correspond to one or more UEs described elsewhere herein, such as UE 120, UE 305, and/or the like.

As shown by reference number 420, the relaying UE 405 may relay a first P2P communication (shown as "Packet 1") and a second P2P communication (shown as "Packet 2") to a first receiving UE 410, associated with a first receiving vehicle, and a second receiving UE 415 associated with a second receiving vehicle. As shown by reference number 425, the first receiving UE 410 may fail to receive the first P2P communication, and the second receiving UE 415 may receive the first P2P communication. As shown by reference number 430, the first receiving UE 410 may receive the second P2P communication, and the second receiving UE 415 may fail to receive the second P2P communication.

As shown by reference number 435, if the relaying UE 405 does not use network coding, then the relaying UE 405 may retransmit both the first P2P communication and the second P2P communication (e.g., for a total of two retransmissions). For example, as shown by reference number 440, the relaying UE 405 may retransmit the first P2P communication because the first receiving UE 410 previously failed to receive the first P2P communication. Furthermore, as shown by reference number 445, the relaying UE 405 may retransmit the second P2P communication because the second receiving UE 415 previously failed to receive the second P2P communication.

Thus, if relaying is used for vehicular communications, network load may increase significantly due to retransmissions. Furthermore, such retransmissions may cause increased interference and may decrease network performance. However, relaying provides advantages such as increased range of P2P communications due to relaying by a relaying UE with a better line of sight, better pathloss conditions, closer proximity to a receiving UE, and/or the like, as compared to an originating UE. Some techniques and apparatuses described herein use network coding to combine P2P communications, unlike example 400 of FIG. 4 where relaying is performed without using network coding. Thus, some techniques and apparatuses described herein may provide advantages associated with relaying without significantly increasing network load, interference, and/or the like, thereby improving network performance. Additional details are provided below.

As indicated above, FIG. 4 is provided as an example. Other examples may differ from what is described with respect to FIG. 4.

Figure 5:
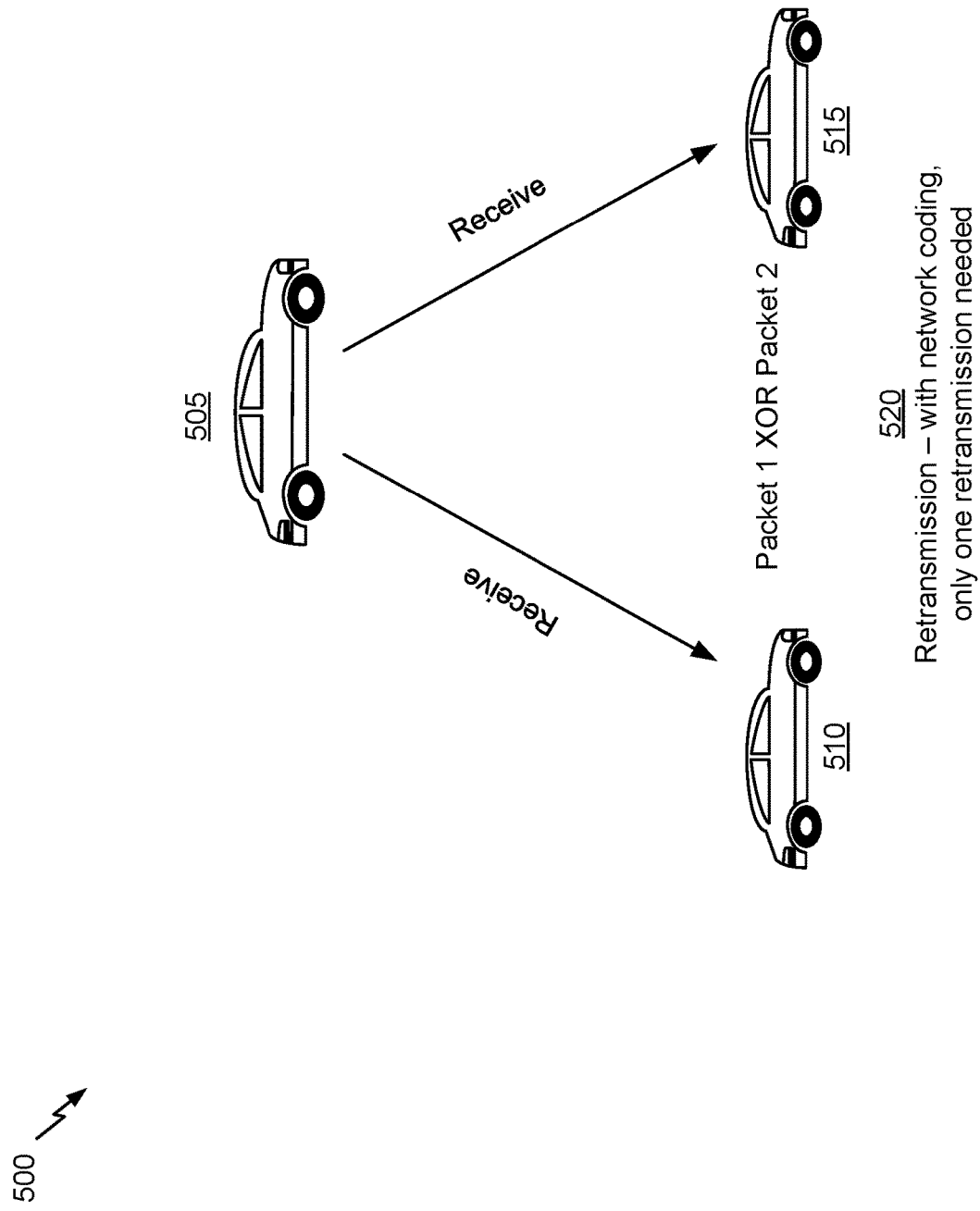
FIGS. 5-7 are diagrams illustrating examples of relaying vehicular communications using network coding, in accordance with various aspects of the present disclosure.

FIG. 5 is a diagram illustrating an example 500 of relaying vehicular communications using network coding, in accordance with various aspects of the present disclosure.

As shown in FIG. 5, a relaying UE 505 may relay (e.g., transmit) P2P communications received from other UEs, such as originating UEs, and may be associated with a relaying vehicle. For example, the relaying UE 505 may relay one or more P2P communications to a first receiving UE 510, associated with a first receiving vehicle, and a second receiving UE 515 associated with a second receiving vehicle. The UEs 505, 510, and/or 515 may correspond to one or more UEs described elsewhere herein.

As shown by reference number 520, if the relaying UE 505 uses network coding to combine P2P communications, then the relaying UE 505 may only retransmit a single P2P communication. As described in more detail elsewhere herein, the single P2P communication may be a combined P2P communication that includes both the first P2P communication and the second P2P communication. For example, the relaying UE 505 may combine the first P2P communication and the second P2P communication using an exclusive or (XOR) operation.

In a V2X communication scenario, having a long range (e.g., transmission range) for V2X communications is particularly important because vehicles may move quickly and transmit critical safety information. For example, increasing the range by 50 meters is equivalent to an increase in reaction time of 360 milliseconds (ms) at a speed of 250 kilometers per hour (km/h), and is equivalent to an increase in reaction time of 640 ms at a speed of 140 km/h. Some techniques and apparatuses described herein permit relaying to be used to increase transmission range with a smaller increase in network load and/or interference as compared to relaying without using network coding.

As indicated above, FIG. 5 is provided as an example. Other examples may differ from what is described with respect to FIG. 5.

Figure 6:
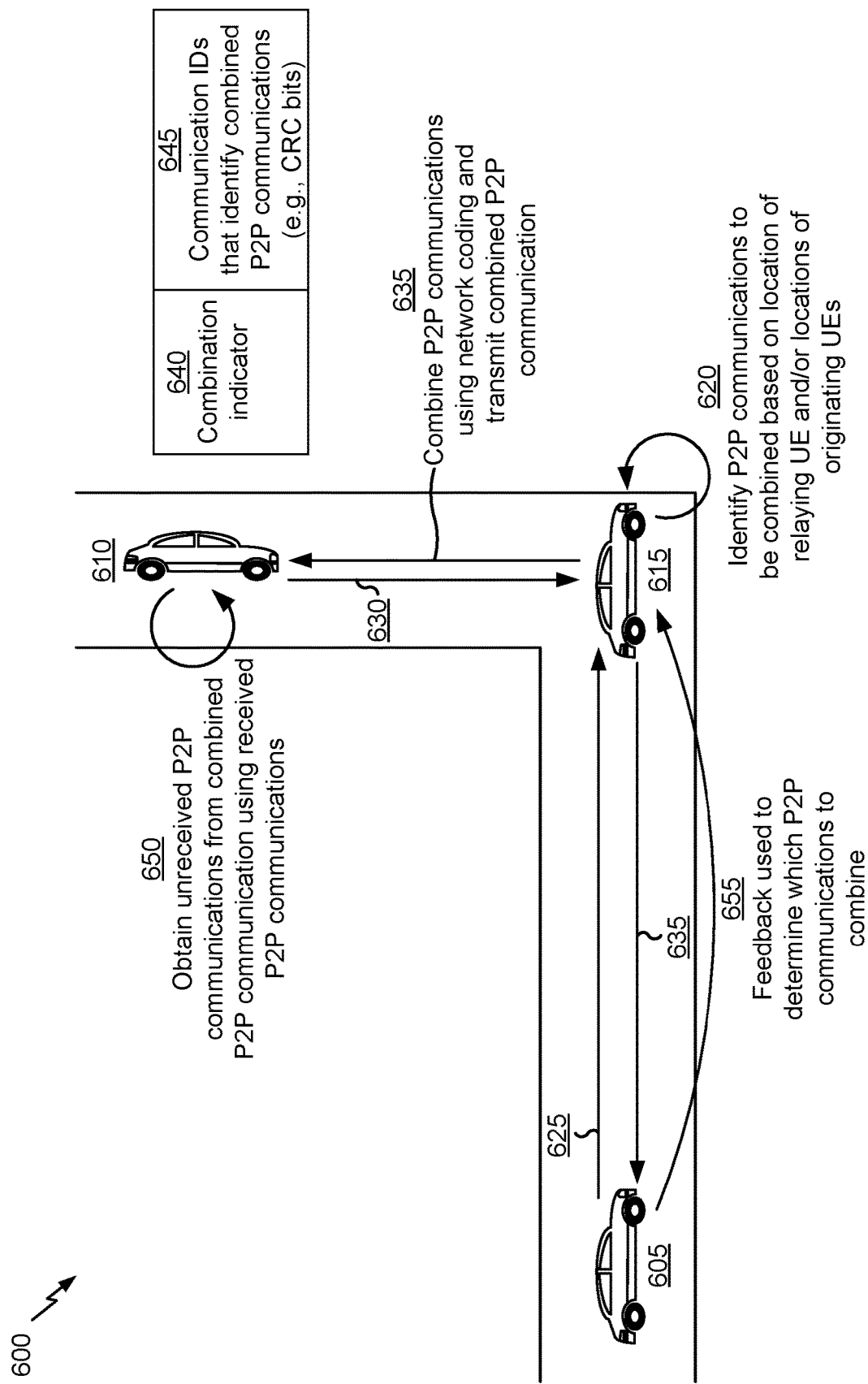

FIG. 6 is a diagram illustrating an example 600 of relaying vehicular communications using network coding, in accordance with various aspects of the present disclosure.

As shown in FIG. 6, a first UE 605 may be associated with a first vehicle, a second UE 610 may be associated with a second vehicle, and a third UE 615 may be associated with a third vehicle. The UEs 605, 610, and/or 615 may correspond to one or more UEs described elsewhere herein, such as UE 120, UE 305, UE 405, UE 410, UE 415, UE 505, UE 510, UE 515, and/or the like. In some aspects, a UE 605, 610, and/or 615 may be integrated into a vehicle, may be located in or on the vehicle, and/or the like. A vehicle may include an autonomous vehicle, a semi-autonomous vehicle, a non-autonomous vehicle, and/or the like. Although UEs 605, 610, and 615 in FIG. 6 are shown as being associated with vehicles, in some aspects, one or more of the UEs 605, 610, 615 may not be associated with a vehicle. For example, a UE 605, 610, and/or 615 may be associated with infrastructure (e.g., traffic infrastructure, such as a traffic signal, a lane signal, a sensor, a traffic controller system, and/or the like), a pedestrian (e.g., via a wearable device), and/or the like.

The UEs 605, 610, 615 may communicate via one or more sidelink channels 310 to exchange SCI 325 and corresponding TBs 330, as described above in connection with FIG. 3. In example 600, the first UE 605 and the second UE 610 may both act as both an originating UE and a receiving UE, and the third UE 615 may act as a relaying UE. As used herein, an originating UE may refer to a UE that schedules an original (e.g., initial) transmission of a V2X communication and transmits the V2X communication to a relaying UE and/or a receiving UE. As used herein, a relaying UE may refer to a UE that receives a V2X communication (e.g., from an originating UE) and relays (e.g., retransmits) the V2X communication. As used herein, a receiving UE may refer to a UE that receives the V2X communication from the originating UE and/or the relaying UE. Thus, a single UE may be capable of operating as an originating UE (e.g., that transmits a V2X communication to one or more other UEs), a relaying UE (e.g., that relays a V2X communications received from another UE), and a receiving UE (e.g., that receives a V2X communication from another UE). Although some aspects are described herein in connection with V2X communications, these aspects may similarly apply to other types of P2P communications.

As shown by reference number 620, the third UE 615 (referred to below as a relaying UE 615) may identify two or more P2P communications to be combined. In some aspects, the relaying UE 615 may identify the P2P communications based at least in part on respective locations of originating UEs from which the P2P communications are received. For example, the relaying UE 615 may determine, based at least in part on the locations of the originating UEs, that the originating UEs are not within a line of sight of one another, and may determine to combine P2P communications from these originating UEs based at least in part on determining that the originating UEs are not within a line of sight of one another. In this way, the relaying UE 615 may increase a likelihood that P2P communications transmitted by the first UE 605 reach the second UE 610, and vice versa (e.g., despite the first UE 605 and the second UE 610 not having a direct line of sight to one another).

In some aspects, a location of a UE may be a geographic location, such as a location within a geographic zone, as described in more detail elsewhere herein. Because the UEs 605, 610, and 615 may be associated with moving vehicles, the respective locations of the UEs 605, 610, and 615 may change over time. In a V2X communication system, packets (e.g., P2P communications, V2X communications, and/or the like) transmitted by UEs 120 that are located nearer to a specific UE 120 are likely to be more relevant to the specific UE 120 than packets transmitted by UEs 120 that are located farther from the specific UE 120 (e.g., packets for collision avoidance are more relevant between UEs 120 that are near each other and more likely to collide). Thus, identifying packets to be combined using network coding based at least in part on locations of UEs 120 may lead to UEs 120 receiving more relevant packets and not receiving less relevant packets (e.g., when the more relevant packets from nearby UEs 120 are combined).

Such location-based determination of packets to be combined using network coding is less relevant to other network coding contexts outside of a V2X context, such as a file-sharing context where multiple packets can be received from different sources and combined to generate a file consisting of the multiple packets. Furthermore, in a V2X context, each packet is independent, self-contained, and includes data that can be used by a receiver, whereas in a file-sharing context, only the combination of all packets (e.g., to generate the file) is useful. However, some techniques and apparatuses described herein may be applied in other such network coding contexts.

Additionally, or alternatively, the relaying UE 615 may determine, based at least in part on the locations of the originating UEs, a distance between the originating UEs, and may determine to combine P2P communications from these originating UEs based at least in part on the distance. For example, if the distance satisfies a threshold (e.g., is greater than or equal to a threshold), then the UE 615 may combine P2P communications from the originating UEs. In this way, the relaying UE 615 may increase a likelihood that P2P communications transmitted by the first UE 605 reach the second UE 610, and vice versa (e.g., despite the first UE 605 and the second UE 610 being located far apart from one another).

Additionally, or alternatively, the relaying UE 615 may determine to combine a P2P communication from an originating UE based at least in part on a pathloss parameter associated with the originating UE (e.g., when the pathloss parameter is greater than or equal to a threshold), based at least in part on a priority associated with the P2P communication (e.g., a priority that is greater than or equal to a threshold), based at least in part on a range requirement associated with the P2P communication (e.g., a range requirement that is greater than or equal to a threshold), based at least in part on an estimated range associated with the originating UE (e.g., an estimated range that is less than or equal to a threshold), based at least in part on a speed of the originating UE communication (e.g., a speed that is greater than or equal to a threshold), and/or the like. In this way, the relaying UE 615 may increase a range of more urgent P2P communications (e.g., with a high priority, a high range requirement, from an originating UE traveling at a high speed, and/or the like), P2P communications associated with an originating UE in a poor transmission condition (e.g., with a high pathloss, a low estimated range, and/or the like), and/or the like.

Additionally, or alternatively, the relaying UE 615 may identify the P2P communications based at least in part on a location of the relaying UE 615. For example, the relaying UE 615 may identify the P2P communications to be combined based at least in part on a proximity of the relaying UE 615 to one or more originating UEs and/or one or more receiving UEs. Additionally, or alternatively, the relaying UE 615 may identify the P2P communications to be combined based at least in part on a position of the relaying UE 615 within a geographic zone, as described in more detail below in connection with FIG. 7.

As shown by reference number 625, the relaying UE 615 may receive a first P2P communication from the first UE 605. In example 600, the relaying UE 615 may determine that the first P2P communication is to be combined with one or more other P2P communications for relaying.

Similarly, as shown by reference number 630, the relaying UE 615 may receive a second P2P communication from the second UE 610. In example 600, the relaying UE 615 may determine that the second P2P communication is to be combined with one or more other P2P communications (e.g., including the first P2P communication) for relaying.

As shown by reference number 635, the relaying UE 615 may combine the two or more P2P communications, using network coding, to form a combined P2P communication. Network coding may refer to using an exclusive or (XOR) operation to combine the P2P communications. For example, the relaying UE 615 may combine the two or more P2P communications using a bitwise XOR operation. In this case, if the P2P communications are not the same size, then the smaller P2P communication(s) may be padded (e.g., with all ones or all zeroes) so that all of the P2P communications to be combined are the same size. As further shown, the relaying UE 615 may transmit the combined P2P communication. For example, the relaying UE 615 may transmit the combined P2P communication to the first UE 605, the second UE 610, and/or one or more other receiving UEs.

As shown by reference number 640, in some aspects, the combined P2P communication may include an indication that multiple P2P communications have been combined to form the combined P2P communication. In some aspects, the indication is a single bit. For example, if the bit is set to a first value (e.g., 1) in a P2P communication, then this may indicate that the P2P communication includes multiple combined P2P communications. Conversely, if the bit is set to a second value (e.g., 0) in a P2P communication, then this may indicate that the P2P communication does not include multiple combined P2P communications. In this way, a receiving UE may properly interpret a received P2P communication based at least in part on the indication of whether multiple P2P communications are included in a received P2P communication.

As shown by reference number 645, in some aspects, the combined P2P communication may include a communication identifier that identifies a P2P communication that has been combined with another P2P communication to form the combined P2P communication. For example, the communication identifier may include a set of cyclic redundancy check (CRC) bits that identifies the P2P communication that has been combined to form the combined P2P communication. Additionally, or alternatively, the communication identifier may include a packet identifier, a sequence number, 5-tuple information (e.g., a source Internet Protocol (IP) address, a destination IP address, a source port, a destination port, and a protocol identifier), and/or other information that can be used to identify the P2P communication. In some aspects, the combined P2P communication may include communication identifiers for all of the P2P communications that have been combined to form the combined P2P communication. For example, the combined P2P communication may include multiple communication identifiers, and each communication identifier may identify a different P2P communication that is included in the combined P2P communication.

By using a set of CRC bits and/or another lower layer identifier to identify a P2P communication, network coding can be performed at the lower layer (e.g., the physical layer), which may result in faster and more efficient identification of the P2P communication as compared to using an upper layer identifier.

In some aspects, the relaying UE 615 may determine a rate at which the combined P2P communication and one or more other P2P communications (e.g., combined P2P communication(s)) are to be relayed (e.g., a number of relaying transmissions per time period). In some aspects, the relaying UE 615 may determine the rate based at least in part on an indication received from another device, such as a base station 110, another UE, and/or the like. In some aspects, the base station 110 and/or a core network device associated with the base station 110 may determine the rate, and may indicate the rate to the relaying UE 615 (e.g., periodically, in system information, in an radio resource control (RRC) message, and/or the like). Additionally, or alternatively, the relaying UE 615 may determine the rate based at least in part on a congestion level of a network associated with the P2P communications (e.g., a congestion level of one or more sidelink channels that carry the P2P communications). For example, a relaying rate may be decreased when the network is more congested, and may be increased when the network is less congested, thereby improving reliability and increasing range when congestion is lower, while also preventing relaying from overloading the network when the network is congested.

As shown by reference number 650, a receiving UE (e.g., shown as the second UE 610) may receive the combined P2P communication. The receiving UE may identify each P2P communication included in the combined P2P communication (e.g., using a respective communication identifier), and may determine whether that P2P communication has been received by the receiving UE. If the P2P communication(s) have been received by the receiving UE, then the receiving UE may use the received P2P communication(s) to obtain another P2P communication included in the combined P2P communication (e.g., if that P2P communication(s) has not been received by the receiving UE). In this way, unreceived P2P communications may be recovered by a receiving UE by combining multiple P2P communications, which does not require individual retransmissions of each of the multiple P2P communications, thereby conserving network resources.

In some aspects, when only two P2P communications are combined, the receiving UE may identify a first P2P communication that has been separately received by the receiving UE, and may use the first P2P communication to recover a second P2P communication that has not been separately received. In some aspects, when more than two P2P communications are combined, the receiving UE may identify multiple (e.g., all but one) P2P communications that have been separately received, and may use those P2P communications to recover a single P2P communication that has not been separately received. The receiving UE may only be able to recover a P2P communication included in the combined P2P communication (and not separately received from the combined P2P communication) if the receiving UE has separately received every other P2P communication included in the combined P2P communication.

In some aspects, the receiving UE may use network coding (e.g., reverse network coding, network decoding, and/or the like) to obtain an unreceived P2P communication. For example, the receiving UE may use an XOR operation (e.g., a bitwise XOR operation) to obtain the unreceived P2P communication by operating on the combined P2P communication and the P2P communication(s), included in the combined P2P communication, that have been separately received by the receiving UE.

As shown by reference number 655, in some aspects, one or more neighbor UEs (e.g., one or more originating UEs, one or more receiving UEs, and/or the like) may provide feedback to the relaying UE 615. The relaying UE 615 may receive the feedback, and may use the feedback to identify P2P communications to be combined.

In some aspects, feedback from a neighbor UE may indicate one or more P2P communications received by the neighbor UE (e.g., using one or more communication identifiers, as described above). Additionally, or alternatively, the feedback may indicate one or more P2P communications not received by the neighbor UE. For example, a neighbor UE may receive P2P communications with non-consecutive packet identifiers, sequence numbers, and/or the like, and may indicate the missing packet identifiers, sequence numbers, and/or the like to the relaying UE 615. When identifying P2P communications to be combined, the relaying UE 615 may select a group of P2P communications so that one or more neighbor UEs have each received all but one of the P2P communications. Otherwise, if a neighbor UE has not separately received two or more of the P2P communications included in the combined P2P communication, then the neighbor UE may be unable to use the combined P2P communication to recover these P2P communications not separately received by the neighbor UE.

In some aspects, the indication of the one or more P2P communications received by the neighbor UE and/or not received by the neighbor UE may be indicated for a time window (e.g., within a threshold amount of time from a current time). Additionally, or alternatively, the neighbor UE may provide a list of most recently received P2P communications from a plurality of UEs. For example, if the neighbor UE is in communication with five other UEs, then the neighbor UE may provide a list of a most recent communication received from each of the five other UEs. In some aspects, a relaying UE may identify a single most recently received P2P communication from each neighbor UE in communication with the relaying UE (e.g., within a time window), and may combine each of these most recently received P2P communications to form the combined P2P communication. In this way, the relaying UE 615 may avoid combining stale P2P communications.

Additionally, or alternatively, a neighbor UE may indicate a reception rate of P2P communications received from one or more other UEs. For example, if the neighbor UE is in communication with a first UE and a second UE, then the neighbor UE may indicate a first reception rate of P2P communications received from the first UE, and a second reception rate of P2P communications received from the second UE. A reception rate may refer to a number of P2P communications received within a time period (e.g., the past 5 seconds, the past 1 second, and/or the like), an average rate at which communications have been received from a neighbor UE, and/or the like. When identifying P2P communications to be combined, the relaying UE 615 may select a group of P2P communications so that all but one of the P2P communications originates from a neighbor UE having a high reception rate (e.g., that satisfies a threshold), and one P2P communication originates from a neighbor UE having a low reception rate. In this way, the relaying UE 615 may increase a likelihood that a receiving UE is able to recover an unreceived P2P communication.

In some aspects, a neighbor UE may indicate, to the relaying UE 615, only reception rates that are greater than or equal to a threshold. In this case, the relaying UE 615 may assume that unreported reception rates are less than or equal to the threshold. Alternatively, a neighbor UE may indicate, to the relaying UE 615, only reception rates that are less than or equal to a threshold. In this case, the relaying UE 615 may assume that unreported reception rates are greater than or equal to the threshold. In this way, network resources may be conserved.

Some aspects are described herein in connection with P2P communications. These aspects may apply to various types of P2P communications and/or similar types of communications, such as V2X communications, D2D communications, sidelink communications, and/or the like.

As indicated above, FIG. 6 is provided as an example. Other examples may differ from what is described with respect to FIG. 6.

Figure 7:
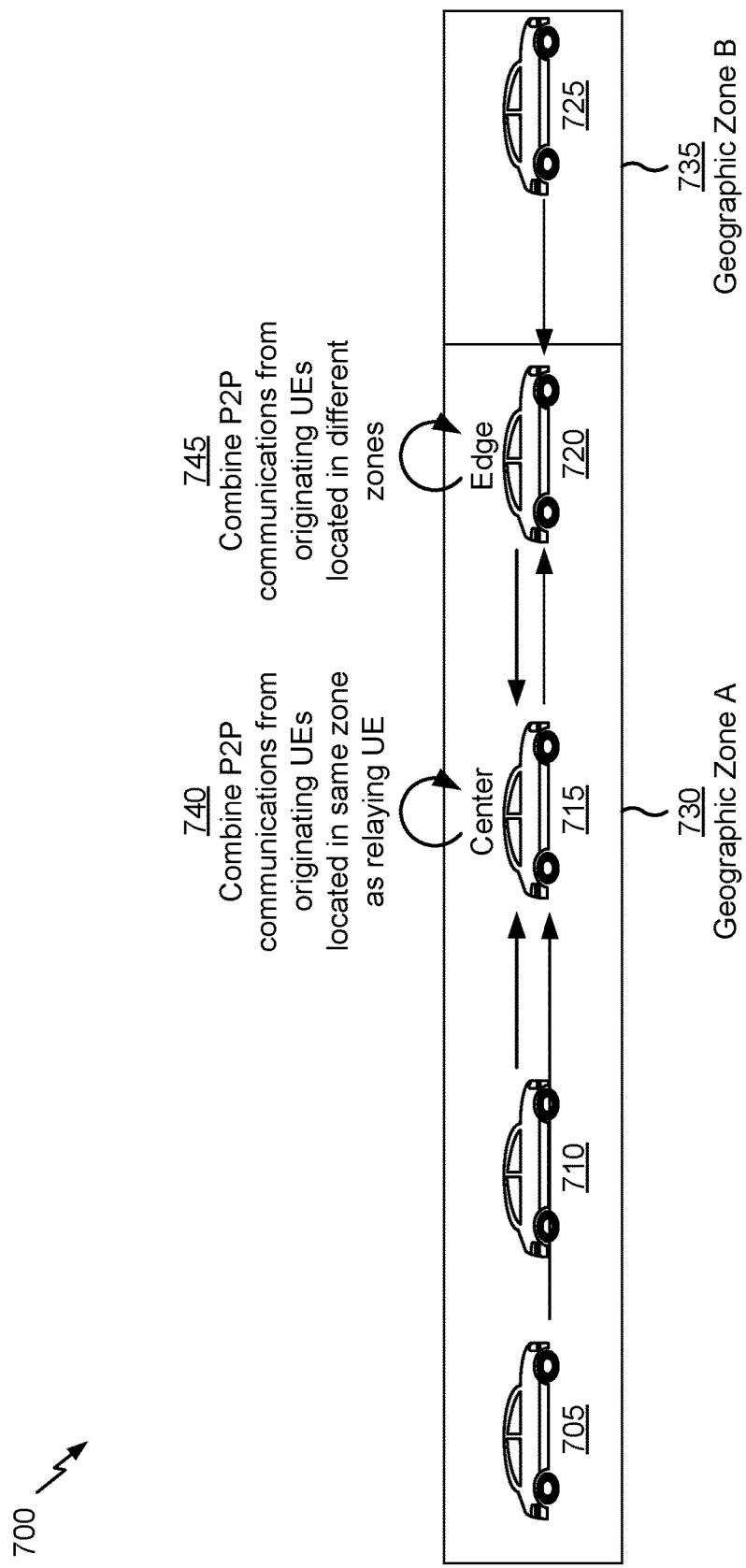

FIG. 7 is a diagram illustrating another example 700 of relaying vehicular communications using network coding, in accordance with various aspects of the present disclosure.

As shown in FIG. 7, a first UE 705 may be associated with a first vehicle, a second UE 710 may be associated with a second vehicle, a third UE 715 may be associated with a third vehicle, a fourth UE 720 may be associated with a fourth vehicle, and a fifth UE 725 may be associated with a fifth vehicle. The UEs 705, 710, 715, 720, and/or 725 may correspond to one or more UEs described elsewhere herein, such as UE 120, UE 305, UE 405, UE 410, UE 415, UE 505, UE 510, UE 515, UE 605, UE 610, UE 615, and/or the like. As described above in connection with FIG. 6, although UEs 705, 710, 715, 720, and 725 in FIG. 7 are shown as being associated with vehicles, in some aspects, one or more of the UEs 705, 710, 715, 720, and/or 725 may be associated with infrastructure, a pedestrian, and/or the like. Furthermore, the UEs 705, 710, 715, 720, and/or 725 may communicate via one or more sidelink channels 310 to exchange SCI 325 and corresponding TBs 330, as described above in connection with FIG. 3.

In example 700, the first UE 705 and the second UE 710 may act as originating UEs, the third UE 715 may act as an originating UE and a relaying UE, the fourth UE 720 may act as an originating UE and a relaying UE, and the fifth UE 725 may act as an originating UE. One or more of the UEs 705, 710, 715, 720, and/or 725 may also act as receiving UEs.

As shown by reference number 730, the first UE 705, the second UE 710, the third UE 715, and the fourth UE 720 may be located within a first geographic zone, shown as "Geographic Zone A." As shown by reference number 735, the fifth UE 725 may be located within a second geographic zone, shown as "Geographic Zone B." In some aspects, one or more geographic zones may be preconfigured (e.g., information that identifies the geographic zones may be hard coded and/or stored in memory of a UE). Additionally, or alternatively, one or more geographic zones may be dynamically configured, such as via information received from a base station 110, another UE, and/or the like. In some aspects, a geographic zone may be defined by a set of coordinates that define a boundary of the geographic zone. While the geographic zones of FIG. 7 are shown as rectangles, other shapes may be used (e.g., circles, squares, and/or the like).

In some aspects, a relaying UE may identify two or more P2P communications to be combined based at least in part on a position of the relaying UE within a geographic zone. For example, as shown by reference number 740, when a relaying UE is located within a threshold proximity of a center of the geographic zone, then the relaying UE may combine P2P communications from originating UEs that are located in the same geographic zone as the relaying UE. For example, the relaying UE 715 may combine P2P communications from the originating UE 705, the originating UE 710, and the originating UE 720. In this way, the relaying UE may increase reliability and improve a packet reception rate. Furthermore, the relaying UE may provide the most relevant P2P communications to neighbor UEs (e.g., P2P communications from UEs within a closer proximity).

As another example, and as shown by reference number 745, when a relaying UE is located within a threshold proximity of an edge of the geographic zone, then the relaying UE may combine a first P2P communication from a first originating UE that is located in a first geographic zone (e.g., a same geographic zone as the relaying UE), and may combine a second P2P communication from a second originating UE that is located in a second geographic zone (e.g., a different geographic zone than the relaying UE). For example, the relaying UE 720 may combine P2P communications from the originating UE 715 and the originating UE 725. In this way, the relaying UE may increase reliability, improve a packet reception rate, and increase range by combining reliable P2P communications. Furthermore, the relaying UE may provide the most relevant P2P communications to neighbor UEs (e.g., P2P communications from UEs within a closer proximity).

As indicated above, FIG. 7 is provided as an example. Other examples may differ from what is described with respect to FIG. 7.

Figure 8:
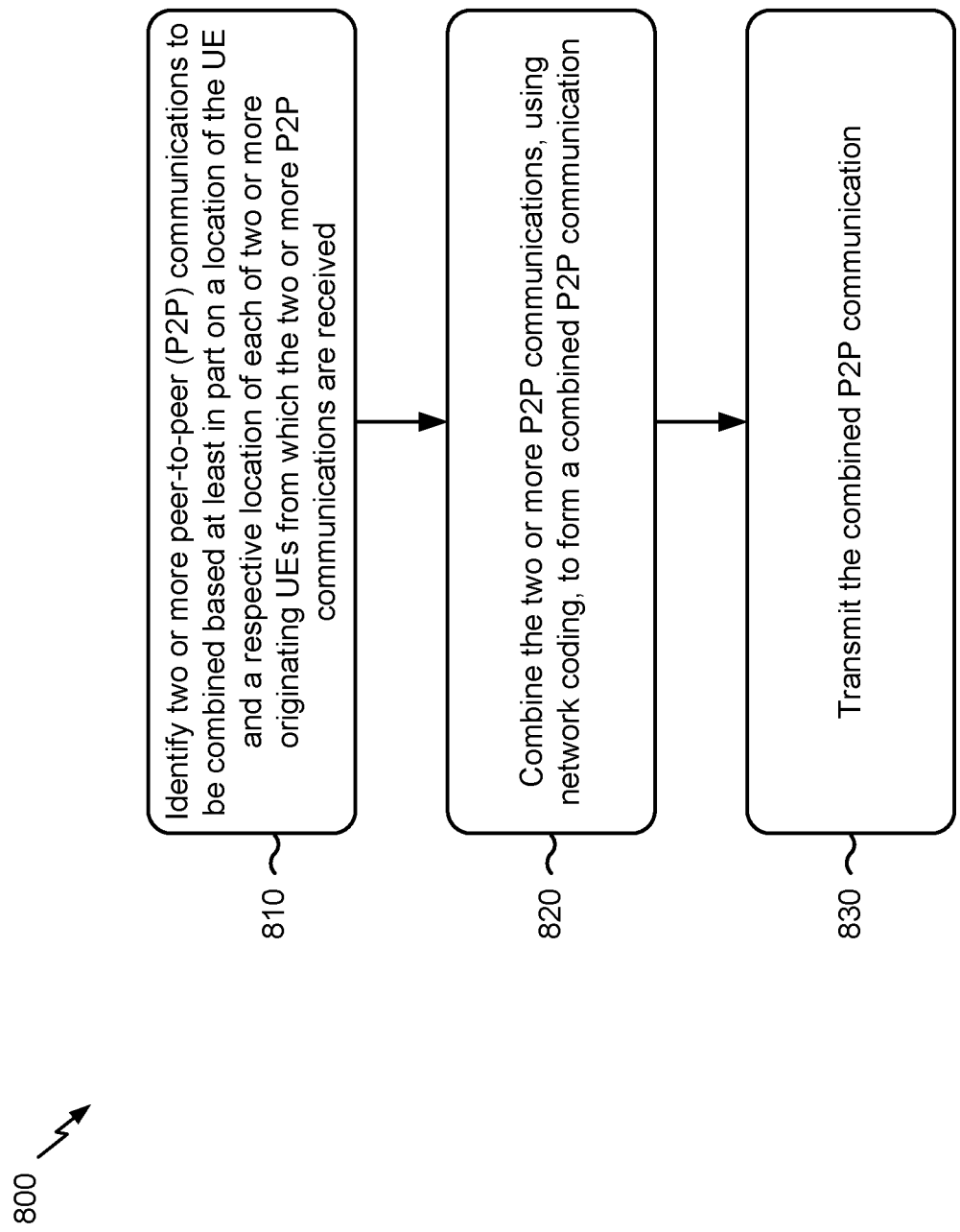

FIG. 8 is a diagram illustrating an example process 800 performed, for example, by a UE, in accordance with various aspects of the present disclosure. Example process 800 is an example where a UE (e.g., UE 120, 305, 405, 410, 415, 505, 510, 515, 605, 610, 615, 705, 710, 715, 720, and/or the like) performs operations associated with relaying vehicular communications using network coding.

As shown in FIG. 8, in some aspects, process 800 may include identifying two or more peer-to-peer (P2P) communications to be combined based at least in part on a respective location of each of two or more originating UEs from which the two or more P2P communications are received (block 810). For example, the UE (e.g., using controller/processor 280 and/or the like) may identify two or more P2P communications to be combined based at least in part on a respective location of each of two or more originating UEs from which the two or more P2P communications are received, as described above in connection with FIGS. 6-7.

As further shown in FIG. 8, in some aspects, process 800 may include combining the two or more P2P communications, using network coding, to form a combined P2P communication (block 820). For example, the UE (e.g., using controller/processor 280 and/or the like) may combine the two or more P2P communications, using network coding, to form a combined P2P communication, as described above in connection with FIGS. 6-7.

As further shown in FIG. 8, in some aspects, process 800 may include transmitting the combined P2P communication (block 830). For example, the UE (e.g., using controller/processor 280, transmit processor 264, TX MIMO processor 266, MOD 254, antenna 252, and/or the like) may transmit the combined P2P communication, as described above in connection with FIGS. 6-7.

Process 800 may include additional aspects, such as any single aspect or any combination of aspects described below and/or in connection with one or more other processes described elsewhere herein.

In a first aspect, the combined P2P communication includes an indication that multiple P2P communications have been combined to form the combined P2P communication.

In a second aspect, alone or in combination with the first aspect, the indication is a single bit.

In a third aspect, alone or in combination with one or more of the first and second aspects, the combined P2P communication includes a communication identifier that identifies a P2P communication, of the two or more P2P communications, that has been combined to form the combined P2P communication.

In a fourth aspect, alone or in combination with one or more of the first through third aspects, the communication identifier includes a set of cyclic redundancy check (CRC) bits of the P2P communication.

In a fifth aspect, alone or in combination with one or more of the first through fourth aspects, the combined P2P communication identifies all of the two or more P2P communications that have been combined to form the combined P2P communication.

In a sixth aspect, alone or in combination with one or more of the first through fifth aspects, the two or more P2P communications are identified based at least in part on feedback received from one or more neighbor UEs.

In a seventh aspect, alone or in combination with one or more of the first through sixth aspects, the feedback indicates at least one of: one or more P2P communications received by the one or more neighbor UEs, one or more P2P communications not received by the one or more neighbor UEs, or a combination thereof.

In an eighth aspect, alone or in combination with one or more of the first through seventh aspects, the one or more P2P communications received by the one or more neighbor UEs are indicated in a list that identifies a plurality of P2P communications most recently received from a corresponding plurality of UEs.

In a ninth aspect, alone or in combination with one or more of the first through eighth aspects, a P2P communication, of the two or more P2P communications, is identified based at least in part on a reception rate of transmissions of one or more neighbor UEs.

In a tenth aspect, alone or in combination with one or more of the first through ninth aspects, the reception rate is indicated to the UE by a neighbor UE.

In an eleventh aspect, alone or in combination with one or more of the first through tenth aspects, the P2P communication is associated with a reception rate that is greater than or equal to a threshold.

In a twelfth aspect, alone or in combination with one or more of the first through eleventh aspects, the two or more P2P communications are identified based at least in part on a location of the UE.

In a thirteenth aspect, alone or in combination with one or more of the first through twelfth aspects, the two or more P2P communications are identified based at least in part on at least one of: a determination that at least two of the two or more originating UEs are not within a line of sight of one another, a determination that a distance between at least two of the two or more originating UEs satisfies a threshold, a pathloss parameter associated with at least one of the two or more originating UEs, an estimated range associated with at least one of the two or more originating UEs, a speed of at least one of the two or more originating UEs, a priority associated with at least one of the two or more P2P communications, a range requirement associated with at least one of the two or more P2P communications, or a combination thereof.

In a fourteenth aspect, alone or in combination with one or more of the first through thirteenth aspects, the two or more P2P communications are identified based at least in part on a position of the UE within a geographic zone.

In a fifteenth aspect, alone or in combination with one or more of the first through fourteenth aspects, the geographic zone is preconfigured.

In a sixteenth aspect, alone or in combination with one or more of the first through fifteenth aspects, the geographic zone is dynamically configured.

In a seventeenth aspect, alone or in combination with one or more of the first through sixteenth aspects, the two or more P2P communications are received from originating UEs located in a same geographic zone as the UE when the UE is located within a threshold proximity of a center of the same geographic zone.

In an eighteenth aspect, alone or in combination with one or more of the first through seventeenth aspects, a first P2P communication, of the two or more P2P communications, is received from a first originating UE located in a first geographic zone, and a second P2P communication, of the two or more P2P communications, is received from a second originating UE located in a second geographic zone when the UE is located within a threshold proximity from an edge of at least one of the first geographic zone or the second geographic zone.

In a nineteenth aspect, alone or in combination with one or more of the first through eighteenth aspects, the two or more P2P communications are combined using an exclusive or (XOR) operation.

In a twentieth aspect, alone or in combination with one or more of the first through nineteenth aspects, the two or more P2P communications and the combined P2P communication are V2X communications.

In a twenty-first aspect, alone or in combination with one or more of the first through twentieth aspects, a rate at which a plurality of P2P communications, including the combined P2P communication, are relayed is determined based at least in part on one or more of: an indication from a base station, an indication from another UE, a congestion level of a network associated with the plurality of P2P communications, or a combination thereof.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a UE, in accordance with various aspects of the present disclosure. Example process 900 is an example where a UE (e.g., UE 120, 305, 405, 410, 415, 505, 510, 515, 605, 610, 615, 705, 710, 715, 720, and/or the like) performs operations associated with relaying vehicular communications using network coding.

As shown in FIG. 9, in some aspects, process 900 may include receiving a combined peer-to-peer (P2P) communication formed using network coding to combine two or more P2P communications, wherein the combined P2P communication includes two or more sets of cyclic redundancy check (CRC) bits corresponding to the two or more P2P communications (block 910). For example, the UE (e.g., using antenna 252, DEMOD 254, MIMO detector 256, receive processor 258, controller/processor 280, and/or the like) may receive a combined P2P communication formed using network coding to combine two or more P2P communications, as described above in connection with FIGS. 6-7. In some aspects, the combined P2P communication includes two or more sets of CRC bits corresponding to the two or more P2P communications.

As further shown in FIG. 9, in some aspects, process 900 may include identifying one or more first P2P communications, of the two or more P2P communications, using one or more sets of CRC bits of the two or more sets of CRC bits (block 920). For example, the UE (e.g., using controller/processor 280 and/or the like) may identify one or more first P2P communications, of the two or more P2P communications, using one or more sets of CRC bits of the two or more sets of CRC bits, as described above in connection with FIGS. 6-7.

As further shown in FIG. 9, in some aspects, process 900 may include obtaining a second P2P communication, of the two or more P2P communications, using the one or more first P2P communications (block 930). For example, the UE (e.g., using controller/processor 280 and/or the like) may obtain a second P2P communication, of the two or more P2P communications, using the one or more first P2P communications, as described above in connection with FIGS. 6-7.

Process 900 may include additional aspects, such as any single aspect or any combination of aspects described below and/or in connection with one or more other processes described elsewhere herein.

In a first aspect, the second P2P communication is obtained based at least in part on performing an exclusive or (XOR) operation using the one or more first P2P communications and the combined P2P communication.

In a second aspect, alone or in combination with the first aspect, the UE may indicate, to a relaying UE from which the combined P2P communication is received, at least one of: one or more P2P communications received by the UE, one or more P2P communications not received by the UE, or a combination thereof.

In a third aspect, alone or in combination with one or more of the first and second aspects, the one or more P2P communications received by the UE are indicated in a list that identifies a plurality of P2P communications most recently received by the UE from a corresponding plurality of UEs.

In a fourth aspect, alone or in combination with one or more of the first through third aspects, the UE may indicate, to a relaying UE from which the combined P2P communication is received, a reception rate of transmissions of one or more neighbor UEs.

In a fifth aspect, alone or in combination with one or more of the first through fourth aspects, the reception rate is indicated when the reception rate is greater than or equal to a threshold.

In a sixth aspect, alone or in combination with one or more of the first through fifth aspects, the reception rate is indicated when the reception rate is less than or equal to a threshold.

In a seventh aspect, alone or in combination with one or more of the first through sixth aspects, the two or more P2P communications and the combined P2P communication are V2X communications.

In an eighth aspect, alone or in combination with one or more of the first through seventh aspects, the one or more first P2P communications includes all P2P communication included in the combined P2P communication except for the second P2P communication.

In a ninth aspect, alone or in combination with one or more of the first through eighth aspects, the one or more first P2P communications have been received by the UE separately from the combined P2P communication, and the second P2P communication has not been received by the UE separately from the combined P2P communication.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a receiving user equipment (UE), comprising:
   identifying two or more peer-to-peer (P2P) communications received from two or more originating UEs to be combined by the receiving UE based at least in part on a respective location of each of the two or more originating UEs;
   combining the two or more P2P communications, using network coding, to form a combined P2P communication; and
   transmitting the combined P2P communication.

2. The method of claim 1, wherein the combined P2P communication includes an indication that multiple P2P communications have been combined to form the combined P2P communication.

3. The method of claim 2, wherein the indication is a single bit.

4. The method of claim 1, wherein the combined P2P communication includes a communication identifier that identifies a P2P communication, of the two or more P2P communications, that has been combined to form the combined P2P communication.

5. The method of claim 4, wherein the communication identifier includes a set of cyclic redundancy check (CRC) bits of the P2P communication.

6. The method of claim 1, wherein the combined P2P communication identifies all of the two or more P2P communications that have been combined to form the combined P2P communication.

7. The method of claim 1, wherein the two or more P2P communications are identified based at least in part on feedback received from one or more neighbor UEs.

8. The method of claim 7, wherein the feedback indicates at least one of:
one or more P2P communications received by the one or more neighbor UEs,
one or more P2P communications not received by the one or more neighbor UEs, or a combination thereof.

9. The method of claim 8, wherein the one or more P2P communications received by the one or more neighbor UEs are indicated in a list that identifies a plurality of P2P communications most recently received from a corresponding plurality of UEs.

10. The method of claim 1, wherein a P2P communication, of the two or more P2P communications, is identified based at least in part on a reception rate of transmissions of one or more neighbor UEs.

11. The method of claim 10, wherein the reception rate is indicated to the UE by a neighbor UE.

12. The method of claim 10, wherein the P2P communication is associated with a reception rate that is greater than or equal to a threshold.

13. The method of claim 1, wherein the two or more P2P communications are identified based at least in part on a location of the UE.

14. The method of claim 1, wherein the two or more P2P communications are identified based at least in part on at least one of:
a determination that at least two of the two or more originating UEs are not within a line of sight of one another,
a determination that a distance between at least two of the two or more originating UEs satisfies a threshold,
a pathloss parameter associated with at least one of the two or more originating UEs,
an estimated range associated with at least one of the two or more originating UEs,
a speed of at least one of the two or more originating UEs,
a priority associated with at least one of the two or more P2P communications,
a range requirement associated with at least one of the two or more P2P communications, or
a combination thereof.

15. The method of claim 1, wherein the two or more P2P communications are identified based at least in part on a position of the UE within a geographic zone.

16. The method of claim 1, wherein the two or more P2P communications are received from originating UEs located in a same geographic zone as the UE when the UE is located within a threshold proximity of a center of the same geographic zone.

17. The method of claim 1, wherein a first P2P communication, of the two or more P2P communications, is received from a first originating UE located in a first geographic zone, and wherein a second P2P communication, of the two or more P2P communications, is received from a second originating UE located in a second geographic zone when the UE is located within a threshold proximity from an edge of at least one of the first geographic zone or the second geographic zone.

18. The method of claim 1, wherein the two or more P2P communications are combined using an exclusive or (XOR) operation.

19. The method of claim 1, wherein the two or more P2P communications and the combined P2P communication are V2X communications.

20. The method of claim 1, wherein a rate at which a plurality of P2P communications, including the combined P2P communication, are relayed is determined based at least in part on one or more of:
an indication from a base station,
an indication from another UE,
a congestion level of a network associated with the plurality of P2P communications, or
a combination thereof.

21. A method of wireless communication performed by a user equipment (UE), comprising:
receiving a combined peer-to-peer (P2P) communication formed using network coding to combine two or more P2P communications, wherein the combined P2P communication includes two or more sets of cyclic redundancy check (CRC) bits corresponding to the two or more P2P communications;
identifying one or more first P2P communications, of the two or more P2P communications, using the combined P2P communication and using one or more sets of CRC bits of the two or more sets of CRC bits; and
obtaining a second P2P communication, of the two or more P2P communications, using the one or more first P2P communications.

22. The method of claim 21, wherein the second P2P communication is obtained based at least in part on performing an exclusive or (XOR) operation using the one or more first P2P communications and the combined P2P communication.

23. The method of claim 21, further comprising indicating, to a relaying UE from which the combined P2P communication is received, at least one of:
one or more P2P communications received by the UE,
one or more P2P communications not received by the UE, or
a combination thereof.

24. The method of claim 23, wherein the one or more P2P communications received by the UE are indicated in a list that identifies a plurality of P2P communications most recently received by the UE from a corresponding plurality of UEs.

25. The method of claim 21, further comprising indicating, to a relaying UE from which the combined P2P communication is received, a reception rate of transmissions of one or more neighbor UEs.

26. The method of claim 21, wherein the two or more P2P communications and the combined P2P communication are V2X communications.

27. The method of claim 21, wherein the one or more first P2P communications includes all P2P communication included in the combined P2P communication except for the second P2P communication.

28. The method of claim 21, wherein the one or more first P2P communications have been received by the UE separately from the combined P2P communication, and wherein the second P2P communication has not been received by the UE separately from the combined P2P communication.

29. A user equipment (UE) for wireless communication, comprising:
   memory; and
   one or more processors operatively coupled to the memory, the memory and the one or more processors configured to:
   identify two or more peer-to-peer (P2P) communications received from two or more originating UEs to be combined by the receiving UE based at least in part on a respective location of each of the two or more originating UEs;
   combine the two or more P2P communications, using network coding, to form a combined P2P communication; and
   transmit the combined P2P communication.

30. A user equipment (UE) for wireless communication, comprising:
   memory; and
   one or more processors operatively coupled to the memory, the memory and the one or more processors configured to:
   receive a combined peer-to-peer (P2P) communication formed using network coding to combine two or more P2P communications, wherein the combined P2P communication includes two or more sets of cyclic redundancy check (CRC) bits corresponding to the two or more P2P communications;
   identify one or more first P2P communications, of the two or more P2P communications, using the combined P2P communication and using one or more sets of CRC bits of the two or more sets of CRC bits; and
   obtain a second P2P communication, of the two or more P2P communications, using the first P2P communication.

* * * * *